United States Patent Office 2,842,285
Patented July 8, 1958

2,842,285

COATING COMPOSITIONS

Justus Russell Sackett, Cynwyd, Pa., assignor to E. I. du Pont de Nemours and Company, Wilmington, Del., a corporation of Delaware No Drawing. Application September 6, 1955
Serial No. 532,793

7 Claims. (Cl. 220—64)

This invention relates to organic coatings for cans and particularly to such coatings for the inside of cans which are used for packaging foods and beverages.

In one method of making cans from thin sheet steel, the flat sheets are coated with a liquid organic coating composition which is dried, usually by baking. The can ends and bodies are cut from this coated steel can stock, and the can body blanks are then shaped and soldered with metal solder. At the temperatures encountered during soldering (of the order of 700°–750° F.), the widely used and relatively inexpensive can coatings made from glyceride drying oils and varnish resins compatible therewith are known to scorch, i. e. darken, at and near the soldered seam. This scorching is undesirable because of its unattractive appearance and because it tends to reduce the serviceability of the coating in the scorched area, even though subsequent coats of similar or different can coatings may be applied thereover.

The broad object of this invention is to prevent or minimize the scorching or darkening of can coatings during the soldering step.

A specific object is to provide glyceride drying oil-varnish resin can coatings which are resistant to solder-scorching.

A further specific object is to provide steel can bodies and completed cans having a glyceride oil-varnish resin coating which shows substantially no darkening from scorching along the soldered seam.

These objects are accomplished by providing a liquid coating composition comprising a solution, in volatile organic solvent, of (1) a heat-bodied varnish comprising (a) glyceride drying oil and (b) 50%–200% by weight based on said oil of varnish resin selected from the class consisting of maleic acid modified ester gums and heat-reactive polymerized petroleum hydrocarbon resins, and (2) 0.05%–0.75% by weight based on the total of (a) and (b) of orthophosphoric acid.

Examples of suitable glyceride drying oils are linseed, tung (or China wood), oiticica, and perilla.

Examples of suitable maleic acid modified ester gums are the esterification products of glycerine, rosin, and a minor amount of maleic acid or anhydride, such as the commercially available "Amberols" 800 series (Rohm and Haas Company), "Teglacs" (American Cyanamid Company), and "Lewisol" maleates (Hercules Powder Company).

Examples of suitable heat-reactive polymerized petroleum hydrocarbon resins are the unsaturated resins (capable of further polymerization when heated) derived from petroleum hydrocarbon stocks containing diolefins like cyclopentadiene, such as the commercially available "Velsicols" AD-6 series (Velsicol Corporation) and "Neville" LX-685 (The Neville Company).

The following specific examples are provided by way of illustration, but not of limitation. Unless otherwise specified, the parts and percentages are by weight.

Example 1

| First portion: | Parts by wt. |
|---|---|
| Maleic acid modified ester gum ("Amberol" 801) | 28.70 |
| Tung oil | 15.60 |
| Bodied refined linseed oil (Gardner-Holdt viscosity P–U) | 8.00 |
| Mineral spirits | 45.70 |
| Xylene | 1.03 |
| Iron linoleate drier (7% Fe) | 0.79 |
| Manganese naphthenate drier (3% Mn) | 0.18 |
| | 100.00 |

| Second portion: | |
|---|---|
| Aqueous 85% orthophosphoric acid | 0.23 |
| Xylene | 0.51 |
| Butyl alcohol | 0.51 |
| | 1.25 |

In this example the first portion, prepared as follows, is a prior art can interior varnish which darkens objectionably at the soldered seam in the can-making process. The whole composition, including the first and second portions, is an improved product of this invention.

The first portion product was prepared by heating the gum and the tung oil to about 580° F. with moderate agitation and holding it until the gum was dissolved. The linseed oil was then added, and the charge was heated to about 550° F. with moderate agitation. After 10–12 minutes the charge was quenched by pouring it into the mineral spirits. When the batch had cooled to a temperature below about 200° F. the mineral spirits lost by evaporation were replaced and the remaining ingredients of the first portion were added. The resulting clear heat-bodied varnish solution had a Gardner-Holdt viscosity of about J.

A part of the batch was set aside as a control for subsequent tests, and the remainder was converted into an improved product of this invention by adding a mixture of the second portion ingredients in the proportion shown, i. e. 1.25 parts by weight of the mixture for each 100 parts of the first portion product. The resulting improved product contained about 0.37% by weight of orthophosphoric acid based on the total weight of resin (gum) and oil, and about 122% by weight of resin based on the oil.

Both the improved product and the prior art product were thinned and applied to flat panels of tin-plated sheet steel can stock in an amount providing 4 milligrams of dry coating per square inch. The coated panels were baked for 12 minutes at about 420° F.

The prior art coating thus produced was amber in color, whereas the improved coating of this invention was considerably paler, almost colorless.

Can bodies and completed cans made by cutting blanks from this stock, forming the blanks so that the coated surface faced inside, and soldering the required seam with conventional solder at 700–750° F. showed the advantage claimed in this invention. The prior art coating had scorched to an objectionable dark brown along the soldered seam; whereas the coating of the improved composition containing phosphoric acid had remained practically unchanged—although a slight darkening was visible under critical examination, it was not objectionable. Additional tests commonly run on can interior coatings showed that the incorporation of phosphoric acid had no objectionable effect on the required properties of the coating, e. g. flexibility, toughness, formability, adhesion, resistance to foodstuffs, and the like.

Example 2

In some uses for can interior coatings, the golden color of the prior art coating described in Example 1 is desirable, but of course without objectionable solder scorching.

The following composition fulfills these requirements when prepared and used in making cans as described in Example 1:

| | Parts by wt. |
|---|---|
| Clear varnish (produced as the first portion of Example 1) | 100.00 |
| Gilsonite-asphalt solution | 1.08 |
| Phosphoric acid solution (second portion of Example 1) | 1.05 |
| | 102.13 |

The gilsonite-asphalt solution used to provide coatings of this composition with a golden color was prepared by running a mixture of 57 parts of gilsonite selects and 43 parts of petroleum asphalt (softening point about 85° C.) and cutting the residue to 48.2% solids with mineral spirits and VM & P naphtha.

The colored varnish of this example contained about 0.31% by weight of orthophosphoric acid based on the total weight of resin and oil.

A specific use of the prior art composition described in Example 1 and of the improved compositions of Examples 1 and 2 is as a base coat for beer and soft drink cans, i. e. as a primer or first coat under a subsequently applied can lining topcoat, which is preferably a baked coating of a solution of a vinyl chloride copolymer. A specific example of such a topcoat is a solution of 14 parts of "Vinylite" VYHH and 6 parts of "Vinylite" VMCH in 80 parts of a mixture of methyl isobutyl ketone, xylene and toluene. ("Vinylite" VYHH is a copolymer containing about 87% vinyl chloride and 13% vinyl acetate; VMCH is a copolymer containing about 86% vinyl chloride; 13% vinyl acetate and 1% maleic acid or anhydride.) Beer and soft drink cans having a multiple-coat interior lining consisting of the above mentioned topcoat over the prior art and new coatings described in Examples 1 and 2 showed the same advantage for the improved phosphoric acid-containing compositions as was shown in the previously described single coat use. There was no adverse effect of the phosphoric acid on the other required properties of this multiple-coat system.

Example 3

First portion:

| | Parts by wt. |
|---|---|
| Heat-reactive polymerized petroleum hydrocarbon resin ("Velsicol" AD-6-3) | 22.80 |
| Refined linseed oil | 19.70 |
| Oiticica oil | 9.80 |
| Aromatic hydrocarbon solvent (boiling range 130°-230° C.) | 47.42 |
| Manganese naphthenate drier (3% Mn) | 0.28 |
| | 100.00 |

Second portion:

| | |
|---|---|
| Aqueous 85% orthophosphoric acid | 0.06 |
| Xylene | 0.14 |
| Butyl alcohol | 0.14 |
| | 0.34 |

In this example, as in Example 1, the first portion is a prior art can interior varnish which darkens objectionably at the soldered seam in the can-making process. The whole composition, including the first and second portions, is an improved product of this invention.

The first portion product was prepared by heating the resin and oil at 500°-580° F. with moderate agitation until a sample at 50% solids in the hydrocarbon solvent had a viscosity of about G (Gardner-Holdt) when the charge was quenched by pouring it into the solvent. When the batch had cooled to a temperature below about 200° F., the solvent lost by evaporation was replaced, and the remaining ingredients of the first portion were added. The resulting clear heat-bodied varnish solution had a Gardner-Holdt viscosity of about J.

A part of the batch was set aside as a control for subsequent tests, and the remainder was converted into an improved product of this invention by adding a mixture of the second portion ingredients in the proportion shown, i. e. 0.34 part by weight of the mixture for each 100 parts of the first portion product. The resulting improved product contained about 0.1% by weight of orthophosphoric acid based on the total weight of resin and oil and about 77% by weight of resin based on the oil.

The prior art product of the first portion and the improved product containing phosphoric acid were applied, baked, and tested in soldered can bodies and in completed cans as described in Example 1. The results were substantially the same, in that the prior art coating scorched objectionably and the improved coating did not.

The improved coating of this example is particularly useful as the sole interior coating for cans adapted to wet-packed foodstuffs.

While the preferred amount of phosphoric acid to be used in the coating compositions of this invention is between about 0.1% and 0.5% by weight based on the total resin and oil, as little as 0.05% produces a useful improvement in solder-scorch resistance and can be used in place of the higher percentages employed in the examples. Above about 0.75% phosphoric acid, no further improvement in solder-scorch resistance is observed and undesirable effects occur, such as reduced toughness of the coating, i. e. reduced resistance to marring in the can-making operations.

In order to distribute the phosphoric acid uniformly throughout the liquid coating compositions of this invention, it is convenient to add a small amount of a solvent for phosphoric acid which is miscible with the other components, e. g. the lower aliphatic monohydric alcohols (ethyl to octyl) and the "Cellosolves."

It is to be understood that the invention is not limited to the particular resins, oils, solvents, driers and coloring agents or to the proportions thereof used in the examples. Other suitable resins and oils are disclosed immediately preceding the examples. Other solvents, driers, and coloring agents suitable for can coatings are well-known to those skilled in the organic coating composition art.

While the amount of resin can be varied between about 50% and about 200% by weight based on the glyceride drying oil, the preferred amount of resin is between about 100% and about 130% on the same basis, in order to provide the optimum balance between hardness, flexibility, formability, toughness, adhesion, color and other essential properties.

The liquid coating compositions of this invention can be applied, preferably to steel or tin-plated steel can stock, by any conventional method, but roller coating is a preferred method in the can coating art. Although the preferred baking schedules range from 10 to 15 minutes at 400°-420° F., other schedules can be used, such as from 5 minutes at about 500° F. to 30-60 minutes at 300° F.

Many widely different embodiments of this invention can be made without departing from the spirit and scope thereof. However, it is not intended to be limited except as indicated in the appended claims.

I claim:

1. A sheet steel can having a soldered seam and a baked interior coating derived from a liquid coating composition comprising a solution, in volatile organic solvent, of (1) a heat-bodied varnish comprising (a) glyceride drying oil and (b) 50%-200% by weight, based on said oil, of varnish resin selected from the class consisting of maleic acid modified ester gums and heat-reactive polymerized petroleum hydrocarbon resins, and (2) 0.05%-

0.75% by weight, based on the total of (a) and (b), of orthophosphoric acid, said coating being substantially free of a scorched appearance along the soldered seam.

2. A product of claim 1 in which the orthophosphoric acid is present in the liquid coating composition in the amount of 0.1%–0.5% by weight based on the total oil and resin.

3. A product of claim 1 in which the varnish resin is present in the liquid coating composition in the amount of about 100%–130% by weight based on the oil.

4. A product of claim 1 in which the liquid coating composition further contains a minor amount of gilsonite-asphalt coloring matter.

5. A sheet steel can having a soldered seam and a baked interior coating derived from a liquid coating composition consisting of a solution, in volatile organic solvent, of (1) a heat-bodied varnish consisting of linseed oil, tung oil and about 122% by weight, based on the total of said oils, of a maleic acid modified ester gum, (2) about 0.37% by weight, based on said varnish, of orthophosphoric acid, (3) water introduced with said acid, and (4) metallic drier, said coating being substantially free of a scorched appearance along the soldered seam.

6. A sheet steel can having a soldered seam and a baked interior coating derived from a liquid coating composition consisting of a solution, in volatile organic solvent, of (1) a heat-bodied varnish consisting of linseed oil, tung oil and about 122% by weight, based on the total of said oils, of a maleic acid modified ester gum, (2) about 0.31% by weight, based on said varnish, of orthophosphoric acid, (3) water introduced with said acid, (4) metallic drier, and (5) gilsonite-asphalt coloring matter, said coating being substantially free of a scorched appearance along the soldered seam.

7. A sheet steel can having a soldered seam and a baked interior coating derived from a liquid coating composition consisting of a solution, in volatile organic solvent, of (1) a heat-bodied varnish consisting of linseed oil, oiticica oil and about 77% by weight, based on the total of said oils, of a heat-reactive polymerized petroleum hydrocarbon resin, (2) about 0.1% by weight, based on said varnish, of orthophosphoric acid, (3) water introduced with said acid, and (4) metallic drier, said coating being substantially free of a scorched appearance along the soldered seam.

References Cited in the file of this patent
UNITED STATES PATENTS

| | | |
|---|---|---|
| 1,995,954 | Albrecht | Mar. 26, 1935 |
| 2,549,558 | Young et al. | Apr. 17, 1951 |
| 2,769,826 | Yoho | Nov. 6, 1956 |